UNITED STATES PATENT OFFICE.

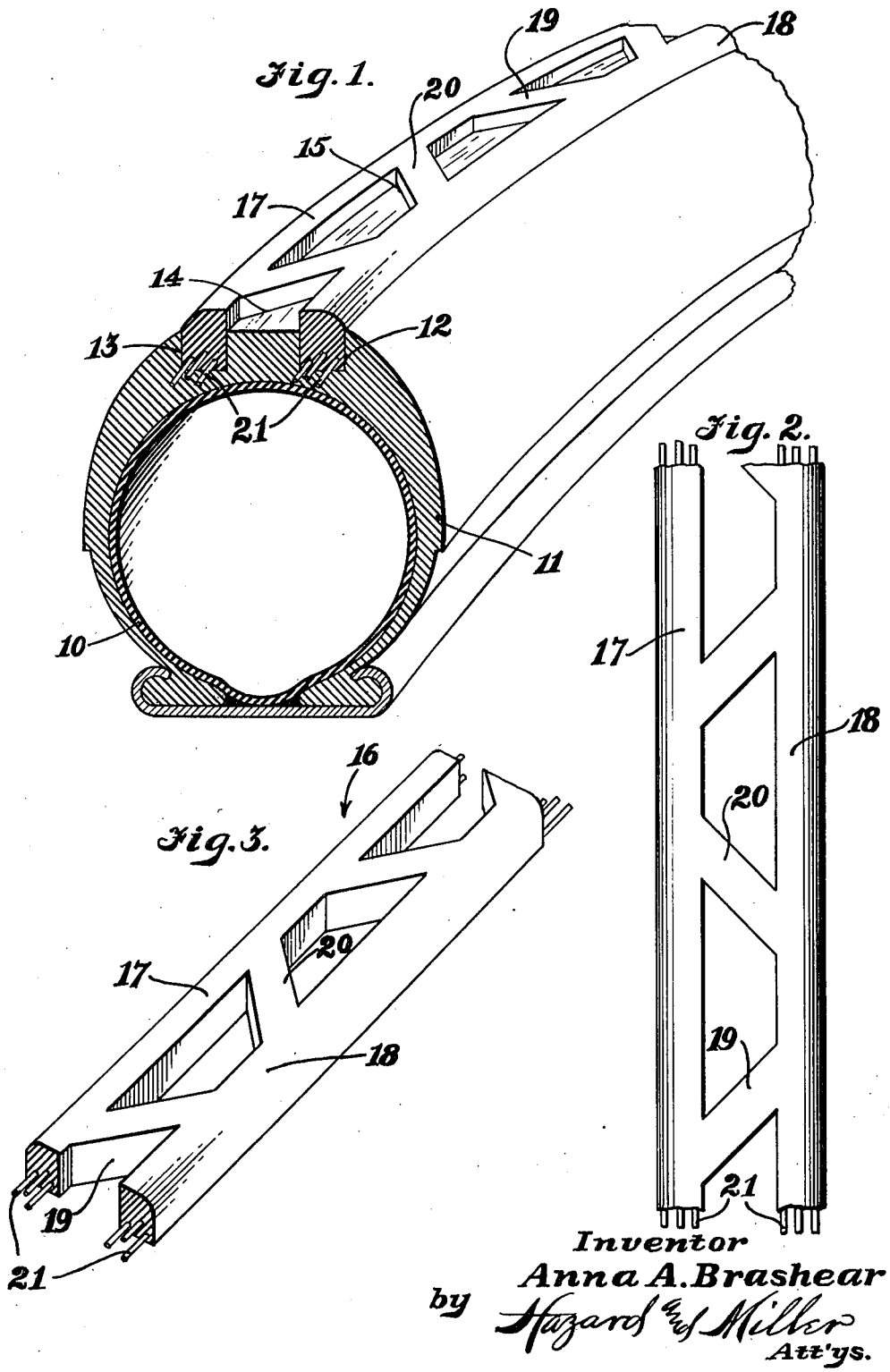

ANNA A. BRASHEAR, OF SANTA BARBARA, CALIFORNIA.

TIRE.

1,311,750. Specification of Letters Patent. Patented July 29, 1919.

Application filed December 14, 1916. Serial No. 136,950.

*To all whom it may concern:*

Be it known that I, ANNA A. BRASHEAR, a citizen of the United States, residing at Santa Barbara, in the county of Santa Barbara and State of California, have invented new and useful Improvements in Tires, of which the following is a specification.

This invention relates to a tire construction and particularly pertains to a detachable tread therefor.

It is the principal object of this invention to provide a detachable tread for the casings of pneumatic tires which will be constructed of durable material presenting a non-skid surface to the ground.

Another object of this invention is to provide a tire tread which may be readily mounted upon the casing of pneumatic tires with which it is intended to be used and which will act in a manner to protect the tire casing from wear, as well as space it a distance from the ground, so as to decrease the liability of puncture.

Another object of this invention is to provide a demountable tire tread which may be placed in position or removed therefrom without the use of special tools or the services of an experienced mechanic.

Another object of this invention is to provide a tire tread which is so constructed as to increase the non-skid qualities of the tire which is so reinforced as to be rigidly seated upon the tire at all times.

It is a further object of this invention to provide a demountable tread for pneumatic tire casings which is simple in its construction and design and will not require radical departure from the present tire designs in order to fit tire shoes for its reception.

Other objects will appear hereinafter.

The invention is illustrated, by way of example, in the accompanying drawings in which:

Figure 1 is a fragmentary view in perspective illustrating a portion of a complete pneumatic tire and casing as mounted upon a clencher rim and as fitted with a detachable tread.

Fig. 2 is a view in plan illustrating a portion of the detachable tread and particularly disclosing the diagonal non-skid cleats.

Fig. 3 is a view in perspective disclosing a fragmentary portion of the tread and particularly illustrating its reinforcing members.

Referring more particularly to the drawings, 10 indicates a pneumatic tube which is here shown as inclosed within a tire shoe or casing 11. This shoe is formed with a pair of circumferential grooves 12 and 13 which extend parallel to each other entirely around the outer face of the tire and diametrically opposite the clencher rim and wheel. These grooves are connected by means of oppositely disposed cross-channels 14 and 15 which occur at given intervals around the tire and between the continuous grooves 12 and 13. This diagonal arrangement of the cross-channels might be varied to attain these results, however, it is believed that the arrangement illustrated is a preferable form.

Removably mounted within the circumferential grooves and cross-channels is a detachable tread 16 which is formed with parallel side beads 17 and 18 and diagonal cleats 19 and 20. This detachable tread is formed of any suitable material, such as the combination of fabric and rubber or leather and the like. The side beads are of a width substantially that of the grooves 12 and 13 and of a height greater than the depth of these grooves in which they are embedded. The outer edges of the side strips are rounded to form a more perfect tread surface. The diagonal cleats 19 and 20 are adapted to seat within the channels 14 and 15 upon the tire and extend therefrom a height equal to the extension of the side beads. The cross pieces or diagonal cleats 19 and 20 serve to hold the beads 17 and 18 in parallel positions and above all they serve to hold the detachable tread from creeping around the casing. In order to satisfactorily reinforce the tread and prevent it from stretching and in time being torn from its seat in the grooves, a series of reinforcing wires 21 is embedded within each of the side beads and continuously arranged throughout the circumference thereof.

In order to mount this tread upon a tire casing prepared for the purpose, the air is removed from the tube 10 and the casing will then become pliable enough to be manipulated so that the demountable tread may be seated within the circumferential grooves 12 and 13 and the transverse channels 14 and 15. As the tread has been properly seated within the tire grooves the tube may be again inflated and will then distend the casing so that the demountable tread will be firmly embedded within the grooves upon the tire. When the tread becomes worn it may be removed and another substituted therefor in a similar manner.

The reinforcing wires 21 are within the grooves 12 and 13 and inside of the periphery of the casing 11, and as long as the inner tube 10 is properly inflated the removable tread 16 cannot become unseated. When the tread becomes worn it may be removed and a new one applied.

It will at once be seen that the demountable tread here provided affords a satisfactory expedient for protecting the casing against wear and also reinforce the casing against blow-out, as well as increasing its non-skid qualities.

While I have shown the preferred construction of my detachable tire tread as now known to me, it will be understood that various changes in the combination, construction and arrangement of parts may be made by those skilled in the art without departing from the spirit of my invention.

I claim:

In a detachable tread tire, a pneumatic casing having parallel circumferential tread grooves and channels connecting said grooves, and a detachable tread adapted to fit in said grooves and having cross pieces adapted to fit in said channels, said detachable tread adapted to project beyond the periphery of the casing and having circumferential wires embedded in position to be within the grooves and inside of the periphery of the casing.

In testimony whereof I have signed my name to this specification.

ANNA A. BRASHEAR.